Oct. 5, 1954  G. F. BRYANT ET AL  2,690,914
MANDREL
Filed Feb. 15, 1951  2 Sheets-Sheet 1
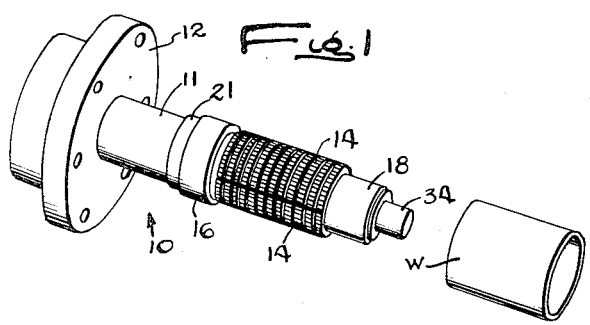
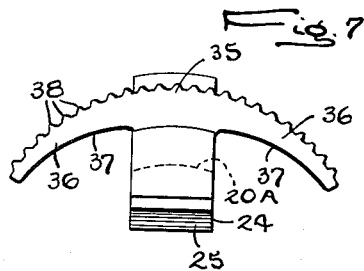
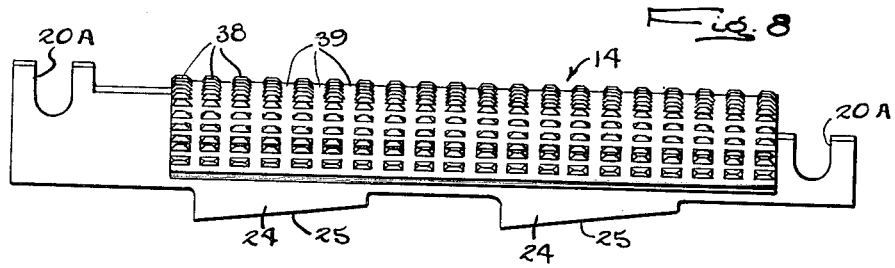
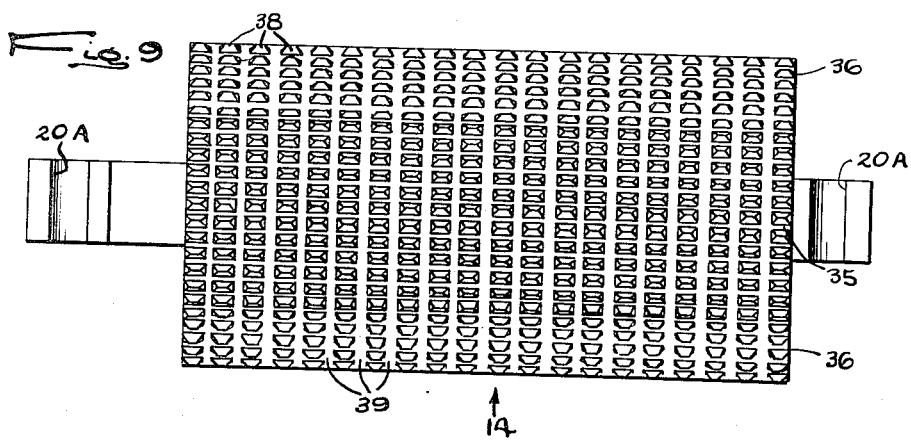
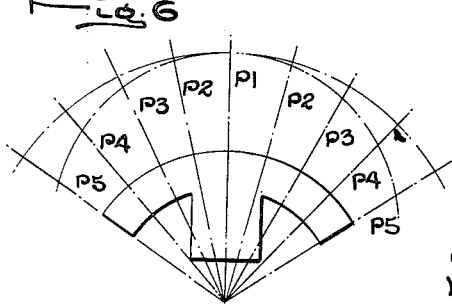
INVENTORS
George F. Bryant
Raymond C. Bryant
Carlson, Pitzner, Hubbard & Wolfe
ATTORNEYS Oct. 5, 1954  G. F. BRYANT ET AL  2,690,914
MANDREL
Filed Feb. 15, 1951  2 Sheets-Sheet 2
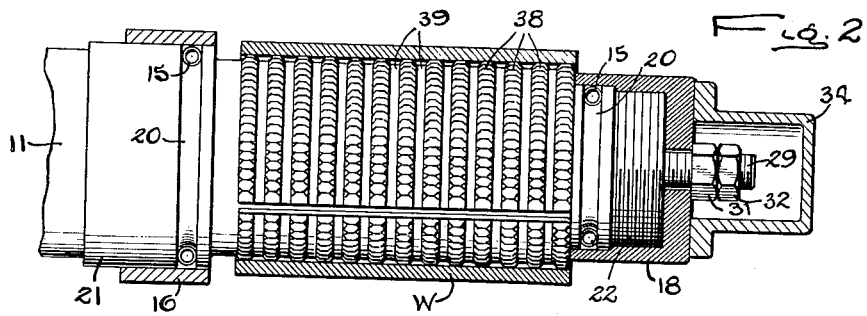
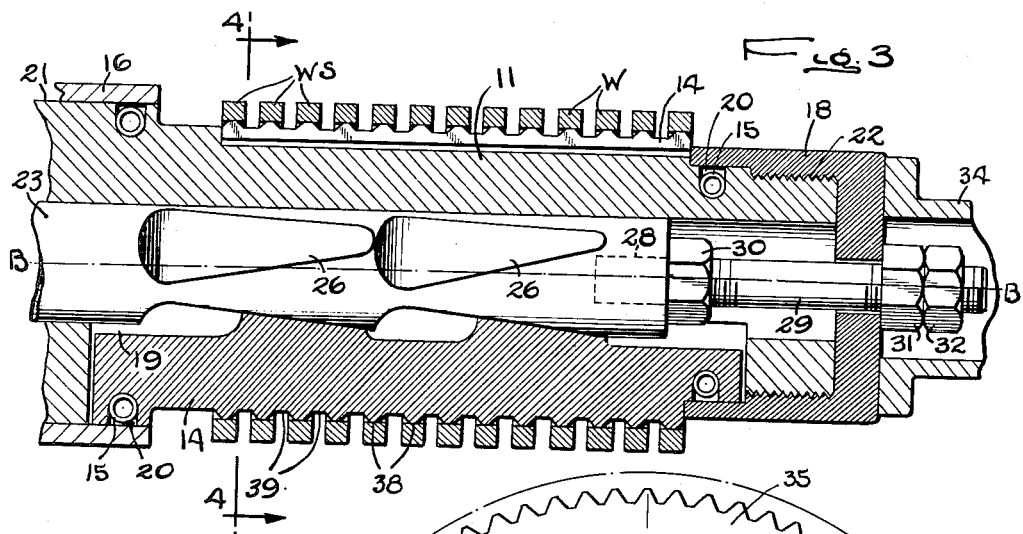
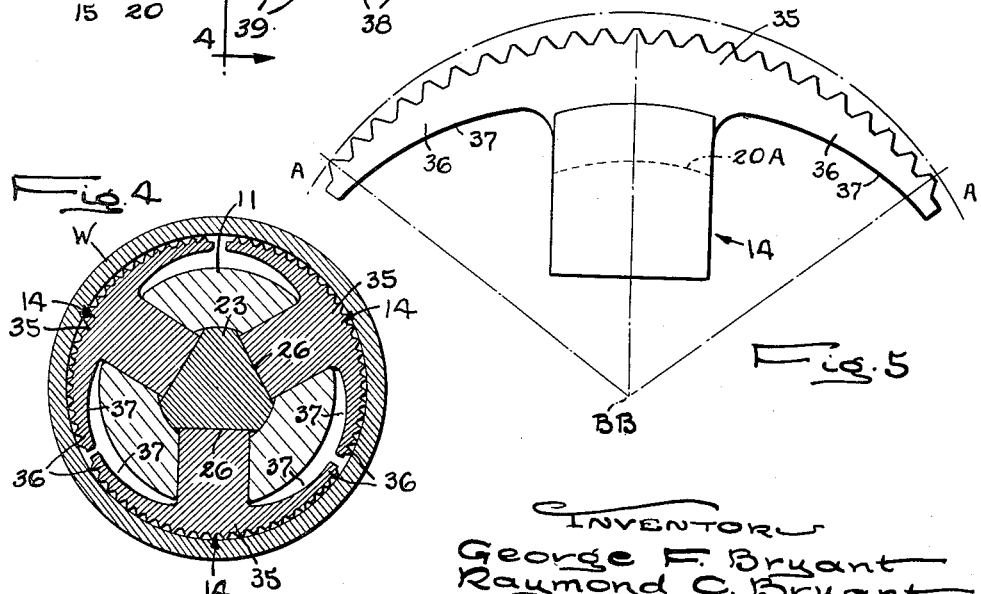

Patented Oct. 5, 1954

2,690,914

UNITED STATES PATENT OFFICE 2,690,914

MANDREL

George F. Bryant and Raymond C. Bryant, Chicago, Ill.

Application February 15, 1951, Serial No. 211,145

10 Claims. (Cl. 279—2)

The present invention pertains generally to mandrels and more specifically to an expansible mandrel for supporting an internally bored workpiece while a machining operation is being performed thereon. This application is a continuation-in-part of our copending application Serial No. 34,044, filed June 19, 1948, now abandoned.

One object of the invention is to provide a novel expansible mandrel which is adapted to grip an internally bored workpiece with a substantially uniform radial pressure.

Another object is to provide a mandrel of the character set forth and which is capable of applying gripping pressure uniformly throughout substantially the entire area of the bore in the workpiece.

A further object is to provide a device of the foregoing type which is adapted to hold a tubular workpiece during a multiple tool severing operation thereon and to retain the severed pieces firmly in place even after the completion of such operation.

Still another object is to provide an expansible mandrel of the type set forth and which will be simple, rugged, and susceptible of economical manufacture.

Further objects and advantages will become apparent from the following detailed description of the invention and also from the accompanying drawings, wherein:

Figure 1 is a perspective view of a mandrel embodying the invention and adapted to rotatably support a tubular workpiece such as the one illustrated.

Fig. 2 is an enlarged fragmentary side view of the mandrel of Fig. 1 showing in section the retainer collars and protective end cap, together with a workpiece mounted in place on the mandrel.

Fig. 3 is an enlarged fragmentary longitudinal sectional view through the mandrel of Fig. 1, taken in the plane of the lateral center line of one of the jaws and after the completion of a multiple severing operation on the workpiece.

Fig. 4 is a transverse sectional view of the mandrel of Fig. 1 taken in the plane of line 4—4 in Fig. 3.

Fig. 5 is an enlarged transverse sectional view through one of the mandrel jaws, showing diagrammatically the gripping action of the latter.

Fig. 6 is a diagrammatic view illustrating the distribution of the radial gripping pressure in a hypothetical mandrel jaw.

Fig. 7 is an end elevation of one of the jaws associated with the mandrel of Fig. 1.

Figs. 8 and 9 show the jaw of Fig. 7 in side elevation and plan, respectively.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more particularly to the drawings, the invention is there exemplified in the form of a mandrel 10 adapted to provide rotational support for an internally bored workpiece W after the latter has been positioned axially thereon. The mandrel comprises a body 11 rigidly fixed in this instance to a flanged adaptor 12, the latter being susceptible of attachment to any appropriate driving head (not shown). Adjacent its projecting end, the mandrel 10 is provided with a plurality of jaws 14 having curved gripping faces and which can be expanded into engagement with the bore of the workpiece W against the action of a pair of peripheral tension springs 15. To provide a limit for the radial outward movement of the jaws 14 and thus preclude their being thrown from the mandrel if the latter should be rotated without a workpiece thereon, a pair of retainer collars 16, 18 are positioned on the body 11 in overlying relationship with the end portions of the jaws 14 and with the springs 15.

The body 11 is fashioned as an elongate, generally cylindrical member having a sizeable bore running axially therethrough. Adjacent the end away from the adaptor 12, the body 11 is formed with a plurality of longitudinally extending, radial slots 19 corresponding to the particular number of jaws in the mandrel. Each of the slots 19 is of appropriate dimension to comfortably receive one of the jaws 14 for radial sliding movement of the latter relative to the body 11 and, incidentally, relative to the longitudinal axis B—B of the mandrel. To accommodate the springs 15, the body 11 has a pair of axially spaced, peripheral grooves 20 running transversely of the slots 19 and adapted to register with corresponding grooves 20A in each of the end portions of the jaws 14. For mounting the retainer collar 16 in place, the body is formed with a unitary annular step 21, the collar 16 in the present instance being retained on the step 21 by means of a shrink fit. The collar 18, on the other hand, is secured in place as by means of suitable threads 22 located on the projecting end of the body 11.

To effect radial expansion of the jaws 14, there is housed within the bore of the body an axially immovable wedge member 23 having mutually inclined actuating surfaces arranged to cooperate with corresponding surfaces on the undersides of the jaws. In the present instance, the jaws 14 are provided with unitary feet 24 having inclined wedging surfaces 25 adapted to abut against a plurality of mutually inclined flats 26 on the wedge 23. The use of multiple inclined surfaces on both the wedge and the jaws makes it possible to incorporate a steeper incline into such surfaces and facilitates rapid expansion and contraction of the mandrel with a relatively short stroke of the wedge member. Axial sliding movement of the wedge 23 relative to the body 11 can be produced in any convenient manner as by the use of a draw rod and hydraulic actuator (not shown). Such movement will, of course, result in sliding the flats 26 across the inclined faces 25 on the jaws, camming the latter radially away from the mandrel axis or, alternatively, permitting the jaws to move radially toward such axis under the action of the springs 15. To define a terminal position for the wedge 23 corresponding to the fully expanded position of the mandrel, the wedge is equipped with an appropriate mechanical stop. The latter preferably comprises a threaded stud 29 mounted in a tapped hole 28 in the wedge and secured in place as by means of a lock nut 30. Threaded upon the outer end of the stud 29 is a stop nut 31 adapted to accost the outer end face of the retainer collar 18. For accommodating workpieces having internal bores of various diameters, the stop nut 31 can be adjusted axially of the stud 29 and secured at any desired point by means of a lock nut 32. For protective purposes, the stop nut 31 and the stud 29 may be enclosed by means of an end cap 34 attached to the retainer collar 18 in any appropriate manner.

To broaden the area of radial pressure distribution between the jaws 14 and the workpiece, the main or central gripping portion 35 of each jaw is extended laterally to form one or more secondary gripping portions 36. The latter are fashioned as arcuate wings and, together with the central portion 35, define the curved gripping face of the jaw.

The general jaw construction thus far described is exemplified in the hypothetical jaw shown in Fig. 6, wherein the gripping pressures acting along various radii of the jaw in response to the expanding force applied at the lateral center line of the jaw by the wedge member 23 are designated by the reference characters P–1 to P–5 inclusive. It will be noted that these radial pressures normally tend to decrease from the radial center line of the jaw toward the lateral extremities of its gripping faces. Consequently, a jaw of this character when moved into gripping engagement with the workpiece will tend to distort the same due to the unequal distribution of the gripping pressure as just explained. Such distortion is, of course, highly undesirable and militates against accurate machine work. Moreover, in workpieces made of material such as cast iron, the distortion referred to above could result in breakage of the workpiece.

Provision is made for effecting the distribution of a substantially uniform radial gripping pressure from the jaws 14 throughout the circumference of the bore in the workpiece. This is accomplished by compensating for the decreased gripping pressure toward the lateral extremities of each jaw resulting from the thrust of the wedge 23 at the lateral center line of each jaw. In keeping with such purpose, the mandrel and jaws are so arranged that there will be considerable deflection of the wing or secondary gripping portions 36 when the mandrel is expanded into engagement with the workpiece. Accordingly, each of the wings 36 in the present instance has a relieved undersurface 37 providing a cross-sectional area which tapers from the central portion of the jaw toward the arcuate extremity of the wing. By means of predetermined calculations, each of the wings 36 can be given that degree of relief needed to produce those critical deflection characteristics which are just sufficient to offset the lateral decreases in radial gripping pressure referred to above. Thus each of the wing portions 36, upon deflection due to contact with the bore of the workpiece, will produce at any given point along its length a deflection pressure complementary to and additive with respect to the component of radial pressure produced at such point due to the wedging force at the center line of the jaw. The net result of such action is the creation of substantially uniform radial pressure over the entire gripping face of each jaw and the application of such uniform pressure to the bore of the workpiece.

Referring more particularly to Fig. 5, it will be perceived that the mandrel 10 and the jaws 14 in the present instance are so arranged that each of the latter will have an initial operative position in which the radius of curvature of its gripping face is greater than that of an arc A—A about the mandrel axis B—B contacting the lateral extremities of the jaw. Thus as the mandrel is expanded into gripping engagement with the workpiece, contact will initially occur between the lateral extremities of each jaw and the bore of the workpiece. Upon further expansion of the mandrel the relieved wing portions 36 will deflect in a radial inward direction and thereby make contact between intermediate points on the gripping faces of each jaw and the bore of the workpiece. With still further expansion of the mandrel, this process continues until the wings 36 are fully deflected and all portions of the gripping face of each jaw 14 have made contact with the bore of the workpiece. The mandrel and each of its jaws 14 are then in their final operative position.

In order to render the mandrel 10 susceptible of use in connection with multiple tool operations on the workpiece W, provision is made for transmitting a high driving torque to the latter. This is achieved in the illustrative mandrel 10 by forming the gripping face of each jaw 14 with a plurality of circumferentially spaced teeth 38. Upon expansion of the mandrel, the teeth 38 grip the bore of the workpiece securely so as to permit the transmission of a substantially higher torque than would otherwise be possible with smooth gripping faces. Such additional torque is, of course, essential in the performance of an operation such as the severing of a tubular workpiece simultaneously into a number of annular slices.

To permit an operation of the foregoing nature to be performed without damage to the mandrel 10, the gripping faces of the jaws are arranged to provide clearance for the cutting tools while still gripping the workpiece securely throughout its length. To this end, the teeth 38 are interrupted by a series of transverse gashes 39 defining on each jaw a plurality of sets of teeth arranged in axially spaced relation along the exterior of the jaw. The gashes 39 are of sufficient depth to extend well below the tips of the teeth 38. Thus in an operation where the workpiece is severed simultaneously into a number of axially spaced rings WS (Fig. 3), the cutting tools can be moved completely through the wall of the workpiece for a clean severing operation without contacting the jaws 14. Due to the multiple point contact between each of the jaws and the various individual pieces of the workpiece after severing, the latter will remain securely in place, making it possible to accurately dimension such pieces with a single cut.

As an incident to the use of the teeth 38 on the gripping faces of the jaws, the radial gripping pressure is applied to the workpiece W at a plurality of circumferentially spaced points. By locating teeth fairly close to the edges of adjacent jaws it is possible to preserve substantial uniformity in the application of the radial gripping pressure to the workpiece, notwithstanding a slight gap between the lateral edges of adjacent jaws.

The foregoing has been borne out in a number of strength tests upon a tubular workpiece, using a mandrel of the type described herein to apply radial pressure to the bore of the workpiece. In each case, the radial pressure applied by the mandrel was steadily increased until the workpiece failed structurally. The radial pressure necessary to produce such failure was found to approach closely the hydrostatic bursting pressure of the workpiece.

We claim as our invention:

1. In an expansible mandrel having a longitudinally slotted body formed with an axial bore therein, together with a wedge member housed within the bore for axial sliding movement relative to said body, the combination comprising a plurality of radially slidable gripping jaws housed within the slots of said body and movable in response to the movement of said wedge member, relieved wing portions presenting curved gripping faces on said jaws and adapted to deflect radially, each of said wing portions being of substantially uniform tapering cross section from the center of its respective jaw toward its arcuate extremity, said mandrel having an initial operative position wherein the radial distance between the longitudinal axis of the mandrel and the lateral extremities of each of said gripping faces is greater than the radial distance from the mandrel axis to the center of each gripping face.

2. A jaw for an expansible mandrel and comprising, in combination, a main gripping portion adapted to engage the bore of a hollow workpiece with a given radial pressure, and a deflectable secondary gripping portion adapted to apply to the bore of the workpiece a component of the radial pressure of said main portion together with an additional increment of radial pressure due to the deflection of said secondary portion, said jaw being thereby adapted to apply to the workpiece substantially uniform radial pressure over the entire face of said jaw.

3. In an expansible mandrel, a jaw comprising the combination of a central gripping portion, and radially deflectable wing portions unitary with said central gripping portion, said wing portions when fully deflected being adapted to apply a unit radial pressure substantially equal to that applied by said central gripping portion.

4. A jaw for an expansible mandrel comprising the combination of a main gripping portion and a secondary gripping portion adapted to deflect substantially upon engagement with a workpiece, said secondary gripping portion having a free edge and an undersurface of substantially uniform contour throughout its length relieved progressively toward said free edge.

5. In an expansible mandrel, a jaw comprising the combination of a central gripping portion, radially deflectable wing portions unitary with said central gripping portion and having a common curvature therewith, each wing portion having a relieved undersurface of substantially uniform contour throughout its length, and a plurality of teeth disposed in circumferentially spaced relation along the curved exterior of said jaw, said teeth being adapted to facilitate the transmission of torque from said jaw to a workpiece supported on said mandrel.

6. In an expansible mandrel, a jaw comprising the combination of a main gripping portion, radially deflectable wing portions unitary with said main gripping portion and having a common curvature therewith, said wing portion having undersurfaces of substantially uniform contour throughout their length, and a plurality of sets of circumferentially spaced teeth fixed to the curved exterior of said jaw and adapted to transmit driving torque to a workpiece, said sets of teeth being arranged in axially spaced relation along the exterior of said jaw.

7. An expansible mandrel having a body with a longitudinally slotted portion and an axial bore therein, said mandrel comprising the combination of a plurality of jaws disposed within said slotted portion for radial sliding movement with respect thereto, arcuate wing portions each having a relieved cross-sectional area extending laterally from each of said jaws and overlying the circumference of said body, each of said wing portions being adapted to deflect substantially upon being brought into contact with the bore of a workpiece, and wedge means for expanding said jaws into contact with the bore of a workpiece so as to deflect said arcuate wing portions.

8. In an expansible mandrel having a body and a plurality of jaws mounted for radial movement with respect to the latter, the combination of radially deflectable wings extending laterally from each of said jaws and having a common gripping face therewith, each said wing extending into overlying relation with the circumference of said body, a plurality of teeth fixed to each of said gripping faces at circumferentially spaced intervals and adapted to apply radial gripping force uniformly over the bore of a workpiece, and means for moving said jaws away from the axis of said mandrel to effect contact between said teeth and the bore of the workpiece with consequent deflection of said wings.

9. An expansible mandrel comprising, in combination, a generally cylindrical body, a series of radially movable jaws mounted on said body, means for effecting radial movement of said jaws, deflectable arcuate gripping faces unitary with said jaws and adapted to engage the bore of a workpiece upon expansion of said mandrel, the arcuate gripping face of each said jaw extending into overlying relation with the circumference of said body, each of said jaws having an initial operative position in which the radius of curvature of its gripping face is greater than that of an arc about the mandrel axis contacting the lateral extremities of said face, each of said jaws also having a final operative position corresponding to the fully expanded condition of the mandrel and wherein the radius of curvature of said gripping face is equal to that of said arc.

10. In an expansible mandrel, the combination comprising a body, a series of radially movable jaws mounted on said body, means for effecting radial movement of said jaws, relieved wing portions on each of said jaws defining deflectable arcuate gripping faces unitary with said jaws, a plurality of teeth disposed in circumferentially spaced relation on each of said gripping faces, the teeth on any one gripping face being arranged to contact the bore of a workpiece in pairs upon expansion of said mandrel, each of said jaws having an initial operative position in which the radius of curvature of its gripping face is greater than that of an arc about the mandrel axis contacting the teeth at the lateral extremities of said face, each of said jaws also having a final operative position corresponding to the fully expanded condition of the mandrel and wherein the radius of curvature of said gripping face is equal to that of said arc.

References Cited in the file of this patent

UNITED STATES PATENTS

| Number | Name | Date |
|---|---|---|
| 640,524 | Bartels | Jan. 2, 1900 |
| 749,202 | Klay | Jan. 12, 1904 |
| 1,039,305 | Martin | Sept. 24, 1912 |
| 1,056,480 | Wood | Mar. 18, 1913 |
| 1,563,636 | Lewis | Dec. 1, 1925 |
| 1,588,787 | Waterman | June 15, 1926 |
| 1,816,093 | Scott | July 28, 1931 |
| 2,018,452 | Laughlin | Oct. 22, 1935 |
| 2,213,379 | Bird et al. | Sept. 3, 1940 |
| 2,373,907 | Olson | Apr. 17, 1945 |
| 2,374,192 | Godfrey | Apr. 24, 1945 |
| 2,436,526 | Olson | Feb. 24, 1948 |